United States Patent
Lai et al.

(10) Patent No.: US 10,591,978 B2
(45) Date of Patent: Mar. 17, 2020

(54) CACHE MEMORY WITH REDUCED POWER CONSUMPTION MODE

(71) Applicant: Microsoft Technology Licensing, LLC, Redmond, WA (US)

(72) Inventors: Patrick P. Lai, Fremont, CA (US); Robert Allen Shearer, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 275 days.

(21) Appl. No.: 15/607,921

(22) Filed: May 30, 2017

(65) Prior Publication Data
US 2018/0348847 A1 Dec. 6, 2018

(51) Int. Cl.
| | | |
|---|---|---|
| G06F 1/32 | (2019.01) | |
| G06F 1/3234 | (2019.01) | |
| G06F 12/0846 | (2016.01) | |
| G06F 1/3287 | (2019.01) | |

(52) U.S. Cl.
CPC .......... *G06F 1/3275* (2013.01); *G06F 1/3243* (2013.01); *G06F 1/3287* (2013.01); *G06F 12/0846* (2013.01); *G06F 2212/1028* (2013.01)

(58) Field of Classification Search
None
See application file for complete search history.

(56) References Cited

U.S. PATENT DOCUMENTS

| | | | |
|---|---|---|---|
| 5,737,746 A | 4/1998 | Hardin et al. | |
| 7,647,452 B1 | 1/2010 | Moll et al. | |
| 8,621,144 B2 | 12/2013 | Eschmann et al. | |
| 9,116,812 B2 | 8/2015 | Joshi et al. | |
| 2004/0006716 A1* | 1/2004 | Schuckle | G06F 1/32 713/300 |
| 2006/0005053 A1 | 1/2006 | Jones et al. | |
| 2007/0124538 A1 | 5/2007 | Abadeer et al. | |
| 2011/0161595 A1 | 6/2011 | Fang et al. | |

(Continued)

FOREIGN PATENT DOCUMENTS

TW 200830097 A 7/2008

OTHER PUBLICATIONS

Jafarsalehi, et al., "Reduction in Cache Memory Power Consumption based on Replacement Quantity", In Journal of Advances in Computer Research, vol. 2, No. 1, Feb. 2011, pp. 49-58.

*Primary Examiner* — Danny Chan

(74) *Attorney, Agent, or Firm* — Alleman Hall Creasman & Tuttle LLP

(57) ABSTRACT

Processors may include cache circuitry that is a significant source of power consumption. A cache is going to be placed into a lower power mode. Based at least in part on this anticipated transition, the contents of the cache data lines are copied into persistent storage. While the cache is in the lower power mode, the tag circuitry is kept operational. When an access request is made to the cache, a relatively fast lookup of the tag in the tag array can be made. The location where the associated cache line is stored in the persistent storage may be determined from the tag data. Upon a tag hit, the system is able to find the contents of the requested cache line in the persistent storage without returning the storage array of the cache to a fully operational state.

16 Claims, 10 Drawing Sheets

(56) References Cited

U.S. PATENT DOCUMENTS

| | | | |
|---|---|---|---|
| 2011/0219190 A1 | 9/2011 | Ng et al. | |
| 2013/0246825 A1* | 9/2013 | Shannon | G06F 1/3275 713/324 |
| 2014/0304475 A1 | 10/2014 | Ramanujan et al. | |
| 2014/0379975 A1* | 12/2014 | Ikegami | G11C 14/0081 711/104 |
| 2016/0321183 A1* | 11/2016 | Govindan | G06F 12/0862 |

* cited by examiner

RECEIVE AN INDICATOR THAT A CACHE MEMORY IN AN OPERABLE POWER CONSUMPTION STATE IS TO BE PLACED INTO A REDUCED POWER CONSUMPTION STATE, THE CACHE MEMORY ORGANIZED AS A SET OF CACHE LINES AND A SET OF TAG ENTRIES
202

IN RESPONSE TO AT LEAST THE INDICATOR, COPY AT LEAST A SET OF VALID CACHE LINES FROM THE CACHE MEMORY TO A MEMORY LOCATED SEPARATE FROM THE CACHE MEMORY
204

PLACE THE CACHE MEMORY INTO THE REDUCED POWER CONSUMPTION STATE, WHEREIN THE SET OF CACHE LINES IN THE CACHE MEMORY ARE NOT ACCESSED WHILE THE CACHE MEMORY IS IN THE REDUCED POWER CONSUMPTION STATE
206

WHILE THE CACHE MEMORY IS IN THE REDUCED POWER CONSUMPTION STATE, RECEIVE A CACHE ACCESS REQUEST FOR A CACHE LINE
208

WHILE THE CACHE MEMORY IS IN THE REDUCED POWER CONSUMPTION STATE, PERFORM, USING THE SET OF TAG ENTRIES, A TAG LOOKUP CORRESPONDING TO THE CACHE ACCESS REQUEST
210

FIGURE 2

```
┌─────────────────────────────────────────────────────────────┐
│ PLACE A CACHE MEMORY THAT IS ORGANIZED AS A SET OF CACHE    │
│   LINES AND A SET OF TAG ENTRIES INTO A REDUCED POWER       │
│   CONSUMPTION STATE THAT RENDERS THE SET OF CACHE LINES     │
│        INOPERABLE AND THE SET OF TAG ENTRIES OPERABLE       │
│                            302                              │
└─────────────────────────────────────────────────────────────┘
                              │
┌─────────────────────────────────────────────────────────────┐
│       WHILE THE CACHE MEMORY IS IN THE REDUCED POWER        │
│  CONSUMPTION STATE, USE THE SET OF TAG ENTRIES TO PERFORM A │
│     TAG LOOKUP CORRESPONDING TO A CACHE ACCESS REQUEST      │
│                            304                              │
└─────────────────────────────────────────────────────────────┘
                              │
┌─────────────────────────────────────────────────────────────┐
│    BASED ON THE RESULT OF THE TAG LOOKUP, DETERMINE THAT A  │
│   COPY OF THE CACHE LINE CORRESPONDING TO THE CACHE ACCESS  │
│             REQUEST IS STORED IN PERSISTENT STORAGE         │
│                            306                              │
└─────────────────────────────────────────────────────────────┘
                              │
┌─────────────────────────────────────────────────────────────┐
│     BASED ON THE RESULT OF THE TAG LOOKUP, DETERMINE THE    │
│   LOCATION IN PERSISTENT STORAGE OF THE COPY OF THE CACHE   │
│        LINE CORRESPONDING TO THE CACHE ACCESS REQUEST       │
│                            308                              │
└─────────────────────────────────────────────────────────────┘
                              │
┌─────────────────────────────────────────────────────────────┐
│            PLACE THE CACHE MEMORY IN A POWER                │
│      CONSUMPTION STATE THAT RENDERS THE SET OF              │
│                 CACHE LINES OPERABLE                        │
│                            310                              │
└─────────────────────────────────────────────────────────────┘
                              │
┌─────────────────────────────────────────────────────────────┐
│        COPY THE CACHE LINE CORRESPONDING TO THE             │
│      CACHE ACCESS REQUEST INTO THE SET OF CACHE             │
│                          LINES                              │
│                            312                              │
└─────────────────────────────────────────────────────────────┘
                              │
┌─────────────────────────────────────────────────────────────┐
│      COPY OTHER CACHE LINES INTO THE SET OF CACHE           │
│                          LINES                              │
│                            314                              │
└─────────────────────────────────────────────────────────────┘
```

FIGURE 3

```
┌─────────────────────────────────────────────────────────────┐
│ AT A CACHE MEMORY AND WHILE THE CACHE MEMORY IS IN A FIRST  │
│   POWER CONSUMPTION STATE, RECEIVE A FIRST CACHE ACCESS     │
│  REQUEST CORRESPONDING TO A CACHE LINE STORED IN A STORAGE  │
│   ARRAY OF THE CACHE MEMORY, THE CACHE MEMORY INCLUDING A   │
│   TAG ARRAY THAT IS USED TO DETERMINE WHETHER THE STORAGE   │
│                  ARRAY HOLDS THE CACHE LINE                 │
│                             402                             │
└─────────────────────────────────────────────────────────────┘
                              │
┌─────────────────────────────────────────────────────────────┐
│    BEFORE PLACING THE CACHE MEMORY IN A SECOND              │
│   POWER CONSUMPTION STATE, COPY THE CACHE LINE              │
│      TO AN ARCHIVE MEMORY THAT IS SEPARATE FROM             │
│                  THE CACHE MEMORY                           │
│                        404                                  │
└─────────────────────────────────────────────────────────────┘
                              │
┌─────────────────────────────────────────────────────────────┐
│ PLACE THE CACHE MEMORY IN THE SECOND POWER CONSUMPTION      │
│  STATE, THE STORAGE ARRAY NOT OPERABLE WHILE THE CACHE      │
│ MEMORY IS IN THE SECOND POWER CONSUMPTION STATE, THE TAG    │
│   ARRAY BEING OPERABLE WHILE THE CACHE MEMORY IS IN THE     │
│            SECOND POWER CONSUMPTION STATE                   │
│                         406                                 │
└─────────────────────────────────────────────────────────────┘
                              │
┌─────────────────────────────────────────────────────────────┐
│    WHILE THE CACHE MEMORY IS IN THE SECOND POWER            │
│    CONSUMPTION STATE, RECEIVE A SECOND CACHE                │
│     ACCESS REQUEST CORRESPONDING TO THE CACHE               │
│                        LINE                                 │
│                         408                                 │
└─────────────────────────────────────────────────────────────┘
                              │
┌─────────────────────────────────────────────────────────────┐
│ IN RESPONSE TO THE SECOND CACHE ACCESS REQUEST, AND WHILE   │
│    THE CACHE MEMORY IS IN THE SECOND POWER CONSUMPTION      │
│   STATE, DETERMINE, USING THE TAG ARRAY, THAT A COPY OF THE │
│       CACHE LINE IS STORED IN THE ARCHIVE MEMORY            │
│                         410                                 │
└─────────────────────────────────────────────────────────────┘
```

FIGURE 4

```
┌─────────────────────────────────────────────────────────────┐
│ OPERATING A CACHE MEMORY IN A REDUCED POWER CONSUMPTION     │
│ STATE WHERE THE STORAGE ARRAY OF THE CACHE MEMORY NOT       │
│         OPERABLE AND THE TAG ARRAY IS OPERABLE              │
│                            502                              │
└─────────────────────────────────────────────────────────────┘
                               │
┌─────────────────────────────────────────────────────────────┐
│   RECEIVE A CACHE ACCESS REQUEST CORRESPONDING TO A CACHE   │
│                           LINE                              │
│                            504                              │
└─────────────────────────────────────────────────────────────┘
                               │
┌─────────────────────────────────────────────────────────────┐
│ IN RESPONSE TO THE SECOND CACHE ACCESS REQUEST, AND WHILE   │
│   THE CACHE MEMORY IS IN THE REDUCED POWER CONSUMPTION      │
│   STATE, DETERMINE, USING THE TAG ARRAY, THAT A COPY OF THE │
│         CACHE LINE IS STORED IN A SEPARATE MEMORY           │
│                            506                              │
└─────────────────────────────────────────────────────────────┘
                               │
┌─────────────────────────────────────────────────────────────┐
│ DETERMINE THE LOCATION, IN THE SEPARATE MEMORY, OF THE COPY │
│                     OF THE CACHE LINE                       │
│                            508                              │
└─────────────────────────────────────────────────────────────┘
                               │
┌─────────────────────────────────────────────────────────────┐
│       RECEIVE THE COPY OF THE CACHE LINE BEFORE             │
│     COPYING OTHER CACHE LINES INTO THE STORAGE              │
│              ARRAY OF THE CACHE MEMORY                      │
│                          510                                │
└─────────────────────────────────────────────────────────────┘
                               │
┌─────────────────────────────────────────────────────────────┐
│         COPYING THE OTHER CACHE LINES INTO THE              │
│          STORAGE ARRAY OF THE CACHE MEMORY                  │
│                          512                                │
└─────────────────────────────────────────────────────────────┘
                               │
┌─────────────────────────────────────────────────────────────┐
│ OPERATE, BASED ON THE CONTENTS OF THE SEPARATE MEMORY,      │
│ THE CACHE MEMORY IN A POWER CONSUMPTION STATE WHERE BOTH    │
│ THE STORAGE ARRAY OF THE CACHE MEMORY AND THE TAG ARRAY     │
│                      ARE OPERABLE                           │
│                          514                                │
└─────────────────────────────────────────────────────────────┘
```

FIGURE 5

CACHE MEMORY WITH REDUCED POWER CONSUMPTION MODE

BACKGROUND

Integrated circuits, and systems-on-a-chip (SoC) may include multiple independent processing units (a.k.a., "cores") that read and execute instructions. These multi-core processing chips typically cooperate to implement multiprocessing. To facilitate this cooperation and to improve performance, multiple levels of cache memories may be used to help bridge the gap between the speed of these processors and main memory. However, while powered-up, the circuitry of an integrated circuit (including caches) consumes power. To reduce the power consumption of an integrated circuit, the circuits (i.e., blocks, logic, etc.) of a chip may be divided into multiple clock domains and/or multiple power domains. The multiple domains allow for the turning off of local power supplies to eliminate leakage current and the dynamic scaling of voltages and clock frequencies to reduce operating current.

SUMMARY

Examples discussed herein relate to an apparatus for processing data that includes a cache memory, a memory, and a controller. The cache memory includes a storage array and a tag array. The storage array is organized into a plurality of cache lines. The tag array provides an index of storage locations associated with data blocks stored in the storage array. The memory is located separate from the cache memory. Data stored by the plurality of cache lines is stored in the memory while the cache memory is in a reduced power consumption state. The tag array, however, is kept operational while the cache memory is in the reduced power consumption state. The controller is configured to write data stored by the plurality of cache lines into the memory before the cache memory is placed in the reduced power consumption state.

In another example, a method of operating a cache memory system includes receiving an indicator that a cache memory in an operable power consumption state is to be placed into a reduced power consumption state. This cache memory is organized as a set of cache lines and a set of tag entries. The tag entries provide an index to the cache lines in the cache memory. Based at least in part on the indicator, at least a set of valid cache lines is copied from the cache memory to a memory located separate from the cache memory. The cache memory is then placed in the reduced power consumption state. While the cache memory is in the reduced power consumption state, the set of cache lines are not accessed. A cache access request for a cache line is received while the cache memory is in the reduced power consumption state. A tag lookup corresponding the cache access request while the cache memory is in the reduced power consumption state is performed using the set of tag entries.

A method of operating a processing system includes receiving, at a cache memory and while the cache memory is in a first power consumption state, a first cache access request corresponding to a cache line stored in a storage array of the cache memory. The cache memory includes a tag array that is used to determine whether the storage array holds the cache line. Before placing the cache memory in a second power consumption state, the cache line is copied to an archive memory that is separate from the cache memory. The cache memory is placed in the second power consumption state. The storage array is not operable while the cache memory is in the second power consumption state. The tag array is operable while the cache memory is in the second power consumption state. While the cache memory is in the second power consumption state, a second cache access request corresponding to the cache line is received. Based at least in part on the second cache access request, and while the cache memory is in the second power consumption state, it is determined, using the tag array, that a copy of the cache line is stored in the archive memory.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIG. 2 is a flowchart illustrating a method of operating a cache memory system.

FIG. 3 is a flowchart illustrating a method of changing the operating mode of a cache memory system.

FIG. 4 is a flowchart illustrating a method of placing and operating a cache memory system in a lower power mode.

FIG. 5 is a flowchart illustrating a method of responding to a cache request while the cache memory system is in a lower power mode.

DETAILED DESCRIPTION OF THE EMBODIMENTS

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a computing device, or an integrated circuit.

Multicore processors and/or systems-on-a-chip (SOCs) may include multiple last level cache slices. Typically, there is large amount of last level cache circuitry that is a significant source of power consumption. In an embodiment, when a cache is going to be placed into a lower power mode, the content of the cache data lines are copied into persistent storage. This persistent storage is persistent to the extent that will retain the data during the low power mode. However, while the cache is in the lower power mode, the tag circuitry is kept operational. Thus, when an access request is made to the cache, a relatively fast lookup of the tag in the (still operational) tag array can be made. In addition, the location where the associated cache line is stored in the persistent storage can be determined from the tag data. Thus, upon a tag hit, the system is able to find the contents of the requested cache line in the persistent storage without returning the storage array of the cache to a fully operational state—thereby improving the recovery (i.e., mode switch) latency.

As used herein, the term "processor" includes digital logic that executes operational instructions to perform a sequence of tasks. The instructions can be stored in firmware or software, and can represent anywhere from a very limited to a very general instruction set. A processor can be one of several "cores" (a.k.a., 'core processors') that are collocated on a common die or integrated circuit (IC) with other processors. In a multiple processor ("multi-processor") system, individual processors can be the same as or different than other processors, with potentially different performance characteristics (e.g., operating speed, heat dissipation, cache sizes, pin assignments, functional capabilities, and so forth). A set of "asymmetric" or "heterogeneous" processors refers to a set of two or more processors, where at least two processors in the set have different performance capabilities (or benchmark data). A set of "symmetric" or "homogeneous" processors refers to a set of two or more processors, where all of the processors in the set have the same performance capabilities (or benchmark data). As used in the claims below, and in the other parts of this disclosure, the terms "processor", "processor core", and "core processor", or simply "core" will generally be used interchangeably.

Figure 1A:
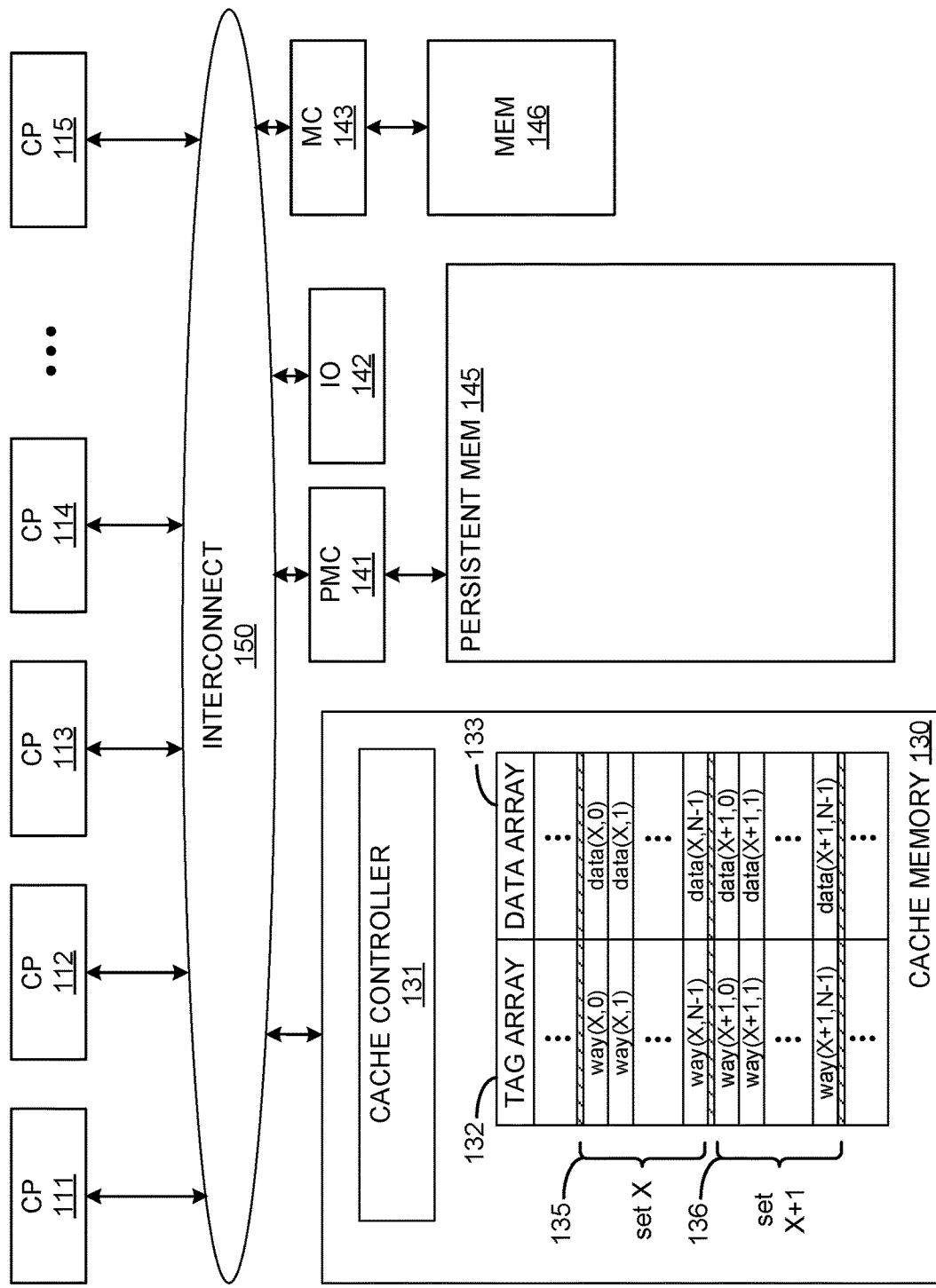
FIG. 1A is a block diagram illustrating a processing system that includes a cache with multiple power modes.

FIG. 1A is a block diagram illustrating a processing system that includes a cache with multiple power modes. In FIGS. 1A-1E, processing system 100 includes core processor (CP) 111, core processor 112, core processor 113, core processor 114, core processor 115, cache memory 130, interconnect 150, persistent memory controller (PMC) 141, input/output (IO) processor 142, memory controller 143, persistent memory 145, and main memory 146. Processing system 100 may include additional processors, interfaces, caches, memory, and IO processors (not shown in FIGS. 1A-1E.)

Core processor 111 is operatively coupled to interconnect 150. Core processor 112 is operatively coupled to interconnect 150. Core processor 113 is operatively coupled to interconnect 150. Core processor 114 is operatively coupled interconnect 150. Core processor 115 is operatively coupled to interconnect 150. Memory controller 141 is operatively coupled to interconnect 150 and to persistent memory 145. Memory controller 143 is operatively coupled to interconnect 150 and to main memory 146. IO processor 142 is operatively coupled to interconnect 150.

Thus, for the example embodiment illustrated in FIGS. 1A-1E, it should be understood that the elements of processing system 100 are arranged in 'crossbar' interconnect topology. Other network topologies (e.g., mesh, ring, star, hybrid(s), etc.) may be employed by processing system 100.

Interconnect 150 operatively couples processors 111-115, memory controller 141, memory controller 143, and IO processor 142 to each other and to cache memory 130. Thus, data access operations (e.g., load, stores) and cache operations (e.g., snoops, evictions, flushes, etc.), by a processor 111-115, cache memory 130, memory controller 141, memory controller 143, and/or IO processor 142 may be exchanged with each other via interconnect 150.

Cache memory 130 includes cache controller 131, tag array 132, and data (i.e., cache line) storage array 133. Tag array 132 and data storage array 133 are organized into congruence classes (i.e., 'cache ways' or 'ways') In FIGS. 1A-1E, tag array 132 is organized into N number of ways per congruence classes. This is illustrated in FIGS. 1A-1E by set X 135 and set X+1 136 each of which are illustrated with N ways with each way corresponding to a data block (i.e., cache line.) Thus, it should be understood that tag array 132 provides an N-way index of data storage array 133 locations that are associated with data blocks (cache lines) stored in the data storage array 133.

When an access request (e.g., read, write, snoop, invalidate, etc.), is received, cache controller 131 compares a tag field of the access address to tag values currently stored in a corresponding tag way of the tag array 132. If a tag match exists, and the tag is valid (i.e., a 'cache hit' or 'tag hit'), then cache memory 130 responds to the access request.

In a first settable configuration (e.g., a fully operational mode) when an address for an access is received by cache memory 130, cache controller 131 activates and reads the entries of a tag set 135-136 in the tag array 132 that correspond to the cache lines that potentially match the address. In other words, the ways in the addressed tag set 135-136 are activated, read, and at least part of their contents compared to the access address. In an embodiment, all the addresses in the data storage array 133 that correspond to the addressed tag set 135-136 are also read. In this settable configuration, when a cache hit occurs, the corresponding data block (cache line) is read from the data storage array 133. The data block read from the data storage array 133 is provided to the requestor (e.g., CP 111-115, PMC 141, IO 142, or MC 143).

In a second settable configuration, data storage array 133 is placed in a lower power mode whereby the contents of data array 133 are not retrievable. In other words, data array 133 may be powered down and/or powered off such that data array 133 is not operational. In an embodiment, tag array 132 may be kept (at least temporarily or for a selectable amount of time) in a fully operational mode while cache memory 130 is in the second settable mode. In an embodiment, while cache memory 130 is in the second settable mode, tag array 132 is placed in a mode whereby tag array 132 is still operational, but consumes less power than the fully operational mode (e.g., a 'sleep' mode where the tag data is retained, but tag compares are slower to complete and/or have a longer latency.)

In the second settable configuration, cache memory 130 uses tag array 132 to determine whether a tag entry corresponding to the requested data block is present in tag array 132. If there is not a tag entry corresponding to the requested data block, then cache memory 130 may respond to the request with a 'cache miss' indication. If there is a tag entry corresponding to the requested data block (i.e. a hit), then cache memory 130 retrieves the requested data block from storage other than data array 133. In an embodiment, cache memory 130 retrieves the requested data block from persistent memory 145 (via PMC 141).

While in a configuration where data can be read from data array 133 (e.g., the first settable configuration,) data block stored in data array 133 are copied to persistent memory 145. At least the valid data blocks stored in data array 133 should be copied to persistent memory 145. However, data associated with invalid data blocks stored in data array 133 may be copied to persistent memory 145 in addition to the valid data blocks stored in data array 133. Invalid data blocks may be copied to persistent memory 145 in order to simplify and/or speed the copying procedure.

In an embodiment, a mapping function relates locations in tag array 132 to locations in persistent memory 145 corresponding to the cache line data associated with that tag. This mapping function may index one or more of a cache memory 130 identifier, tag way, and storage array 133 bank to locations in persistent memory 145. In another embodiment, the mapping function may organize the data copied from the data array 133 into persistent memory 145 using pointers that are referenced to a specific cache slice, cache way, and/or cache bank so that the section (e.g., page, data block, row, burst) of persistent memory 145 that is needed to be accessed to respond to the request can be determined (and accessed) quickly.

In an embodiment, each of processors 111-115 distributes data blocks (e.g., cache lines) to caches 133 and other caches (not shown in FIGS. 1A-1E) according to at least two cache hash functions. For example, a first cache hash function may be used to distribute data blocks being used by at least one processor 111-115 to all of cache at the same cache level as cache memory 130. In another example, one or more (or all) of processors 111-115 may use a second cache hash function to distribute data blocks to less than all of these caches.

Provided all of processors 111-115 (or at least all of processors 111-115 that are actively reading/writing data to memory) are using the same cache hash function at any given time, data read/written by a given processor 111-115 will be found in the same last-level cache regardless of which processor 111-115 is accessing the data. In other words, the data for a given physical address accessed by any of processors 111-115 will be found cached in the same cache regardless of which processor 111-115 is making the access. The cache memory 130 that holds (or will hold) the data for a given physical address is determined by the current cache hash function being used by processors 111-115, memory controller 141, memory controller 143, and IO processor 142. The current cache hash function being used by processing system 100 may be changed from time-to-time. The current cache hash function being used by processing system 100 may be changed from time-to-time in order to reduce power consumption by turning off (or placing in a lower power mode) one or more of caches (e.g., cache memory 130).

In an embodiment, processing system 100 and/or cache memory 130 may receive (or generate) an indicator that cache memory 130 is to be placed into a reduced power consumption state (e.g., a lower power, a super low power, an 'off', and/or unpowered state.) In response to at least this indicator, a set of valid cache lines are copied from cache memory 130 to a separate memory. In an embodiment, this separate memory is persistent memory 145. In another embodiment, this separate memory may be part of memory 146.

Cache memory 130 is placed in the reduced power consumption state. In this reduced power consumption state, data array 133 is not accessed. Data array 133 may not be accessed in the reduced power consumption state because data array 133 is not operational (e.g., because it is not receiving power and/or is not receiving a clock signal.)

While cache memory 130 is in the reduced power consumption state, one or more of processors 111-115, PMC 141, IO 142, and/or MC 143 may make a request to access a cache line previously stored in data array 133. This request is received by cache memory 130. While cache memory 130 is still in the reduced power consumption state (e.g., without reactivating data array 133), cache controller 131 performs a tag lookup for the requested line using tag array 132. In some instances, based on the results of this tag lookup, cache controller 131 may determine that the requested cache line is not stored in memory 145 (i.e., a miss.) In other instances, based on the results of this tag lookup, cache controller 131 may determine that the requested cache line is stored in memory 145.

The results of the tag lookup may be used to determine a location in memory 145 that corresponds to the requested cache line. For example, the result of the tag lookup may indicate a tag way and a tag bank that hold an entry corresponding to the requested cache line. These indicators may be input to a mapping function that related the tag way and tag bank to the location in memory 145 that holds the requested cache line.

In an embodiment, cache memory 130, in a fully operational state, receives a first cache access request corresponding to a cache line stored in data array 133. Cache memory 130, while in the fully operation state, uses tag array 132 to determine that data array 133 holds a valid copy of the requested cache line. Also while in the fully operation state, cache memory 130 can access data array 133 to retrieve the requested cache line (and/or forward to interconnect 150.)

Before placing cache memory 130 in a limited operation state (e.g., a lower power consumption state), certain contents being stored by data array 133 (e.g. valid cache lines) are copied to an archive memory (e.g., persistent memory 145 and/or memory 146.) When cache memory 130 is placed in the limited operation state, data array 133 is not operable while, in contrast, tag array 132 is operable (and continues to maintain its contents through the transition between operational states.)

While in the limited operation state, cache memory 130 may receive a second cache access request. Cache memory 130, while in the limited operation state, uses tag array 132 to determine that the archive memory holds a valid copy of the requested cache line. In an embodiment, processing system 100 may copy the (second) requested cache line (or a data block that includes the requested cache line) from the archive memory before requesting other cache lines from the archive memory. In this manner, the requestor of the cache line may be provided the requested cache line before the contents of data array 133 being restored from the archive memory. After cache memory 130 is returned to a fully operational state, the remaining cache lines being stored in the archive memory are copied back to data array 133. This allows cache memory 130 to operate by accessing data array 133 for cache line contents rather than accessing the archive memory.

Figure 1B:
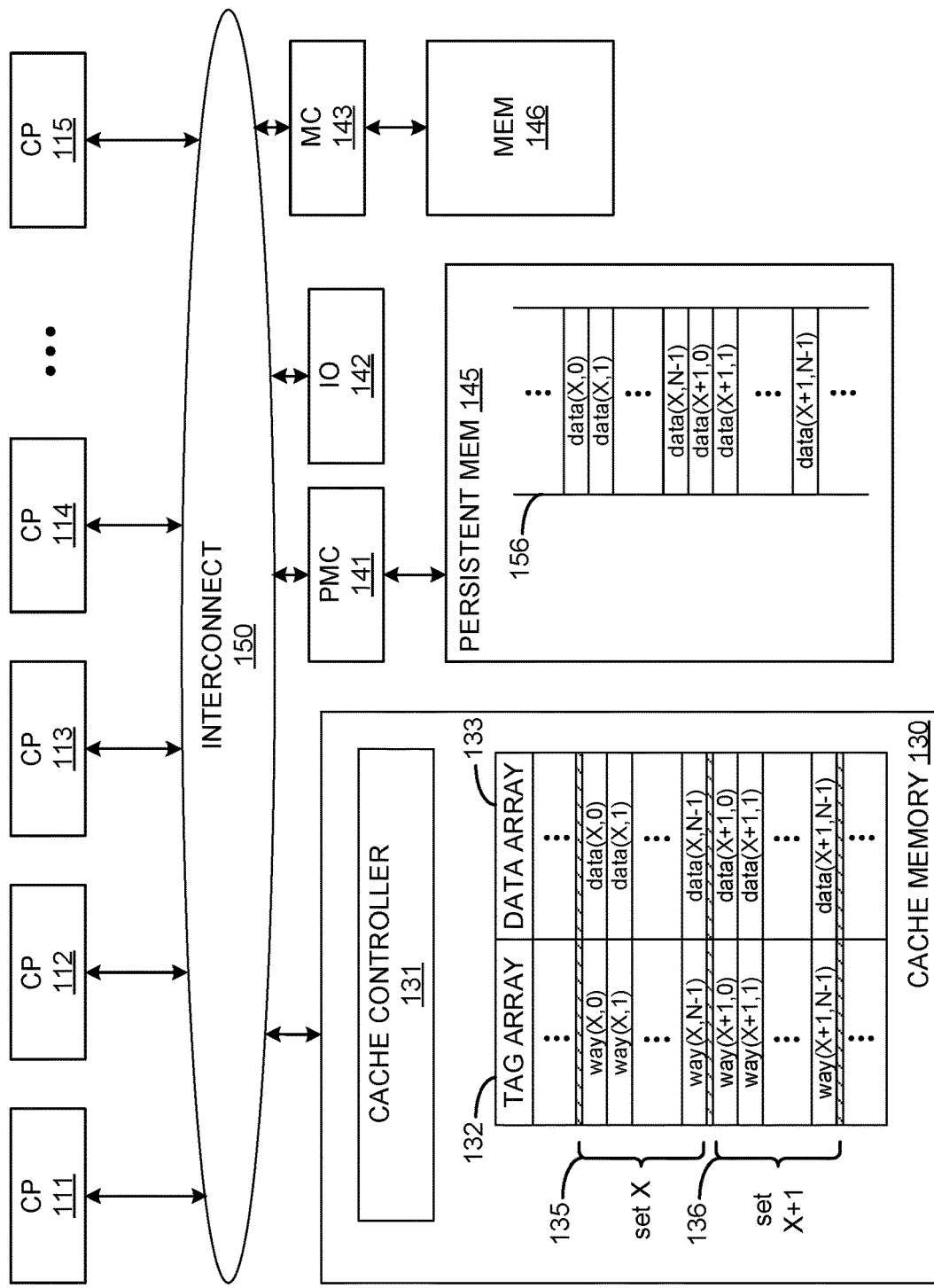
FIG. 1B illustrates the processing system preparing to change the cache from fully operational mode to a lower power mode.

In an embodiment, processing system 100 prepares to place cache memory 130 in a limited operation state. This limited operation state may be characterized as one where data array 133 is not operable while, in contrast, tag array 132 is operable. Processing system 100 prepares to enter the limited operation state by copying data being stored by data array 133 (e.g., valid cache lines, or the entire contents of data array 133 whether valid or not) to persistent memory 145. This is illustrated in FIG. 1B where persistent memory 145 is illustrated holding a copy of (at least) data 156—which is comprised of cache lines data(X,0), data(X,1), etc.

Figure 1C:
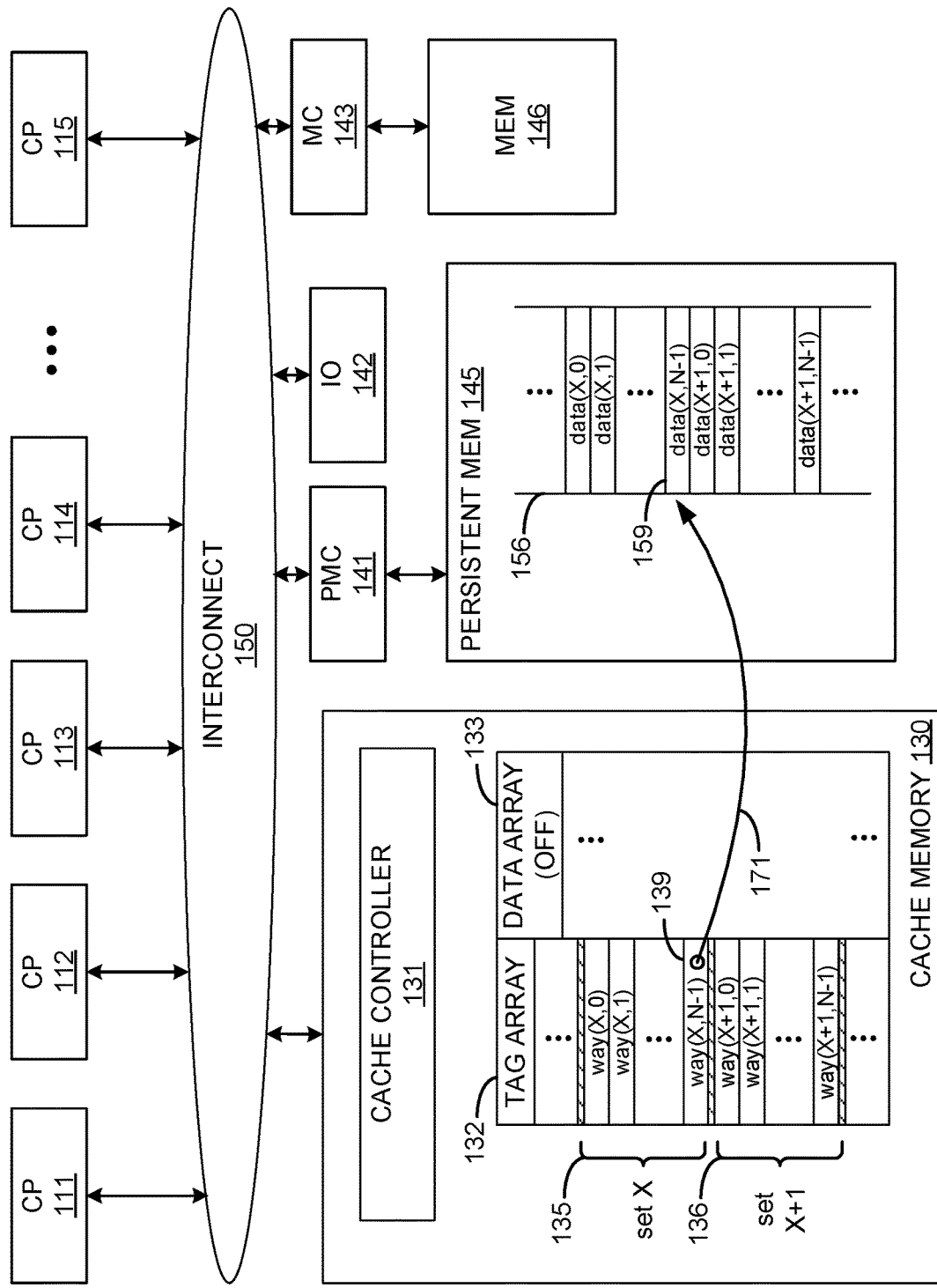
FIGS. 1C-1D illustrate a cache read operation by the processing system when the data array of the cache is in a lower power mode.

After cache 100 is placed in the limited operation state, data array 133 is not operational. This is illustrated in FIG. 1C by the indication that data array 133 is 'off' and the lack of 'data( )' being shown in data array 133. While in the limited operation state, cache memory 130 may receive a second cache access request. Cache memory 130, while in the limited operation state, can use tag array 132 to determine that memory 145 holds a valid copy of the requested cache line. Tag array 132 may also be used to determine the location in memory 145 where the data corresponding the access request is to be found. This is illustrated in FIG. 1C by arrow 171 running from the entry 139 in tag array 132 to cache line entry 159 in memory 145.

Figure 1D:
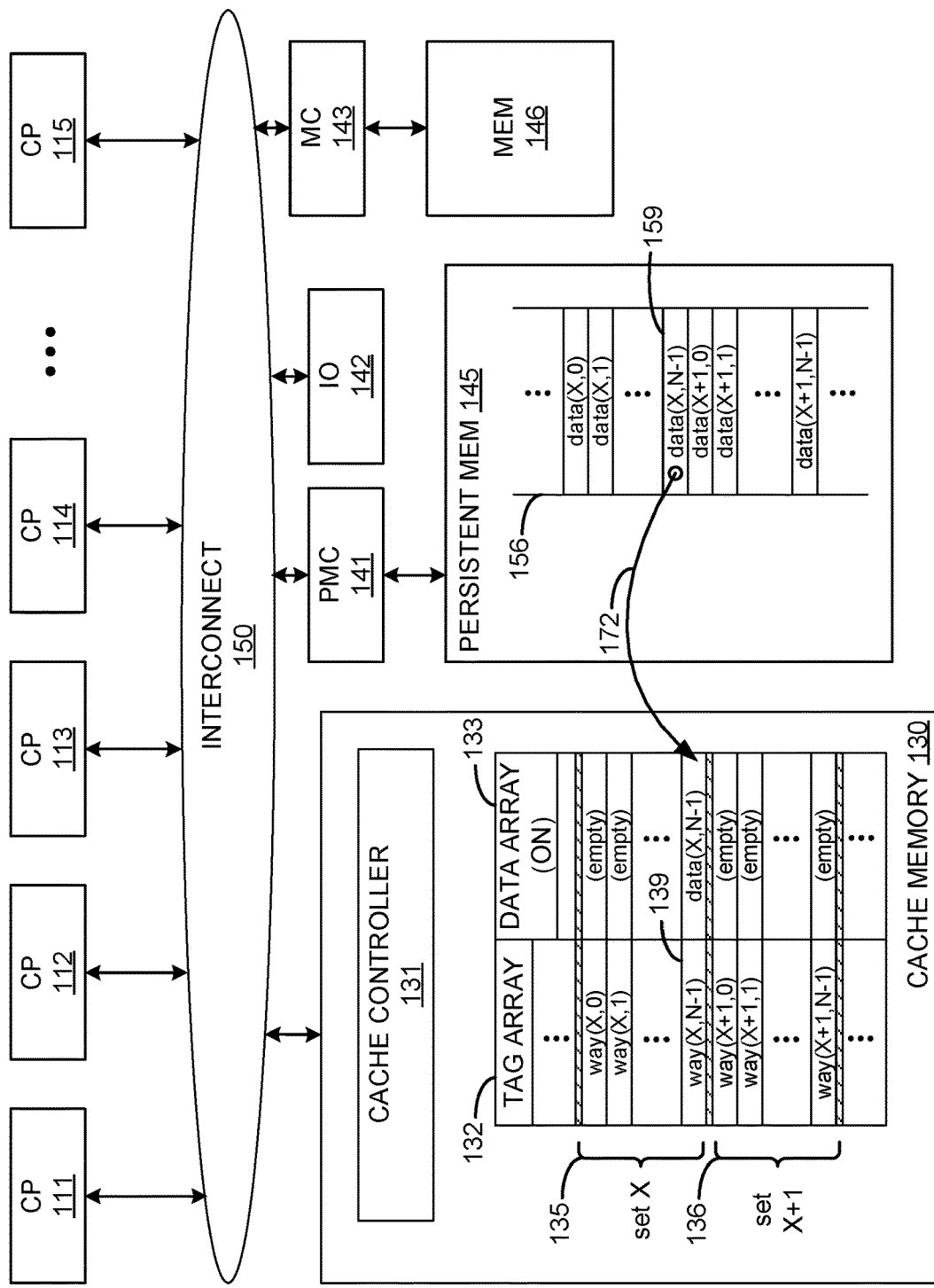

In response to the second cache access request (e.g., in response to the second cache access request resulting in a hit), cache memory 130 may be returned to the fully operational state. This is illustrated in FIG. 1D the indication that data array 133 is 'on' and the presence of 'empty' entries being shown in data array 133. After cache memory 130 is returned to the fully operational state, the first entry copied from memory 145 to data array 133 may be the cache line requested by the second request. This is illustrated in FIG. 1D by at least arrow 172.

Figure 1E:
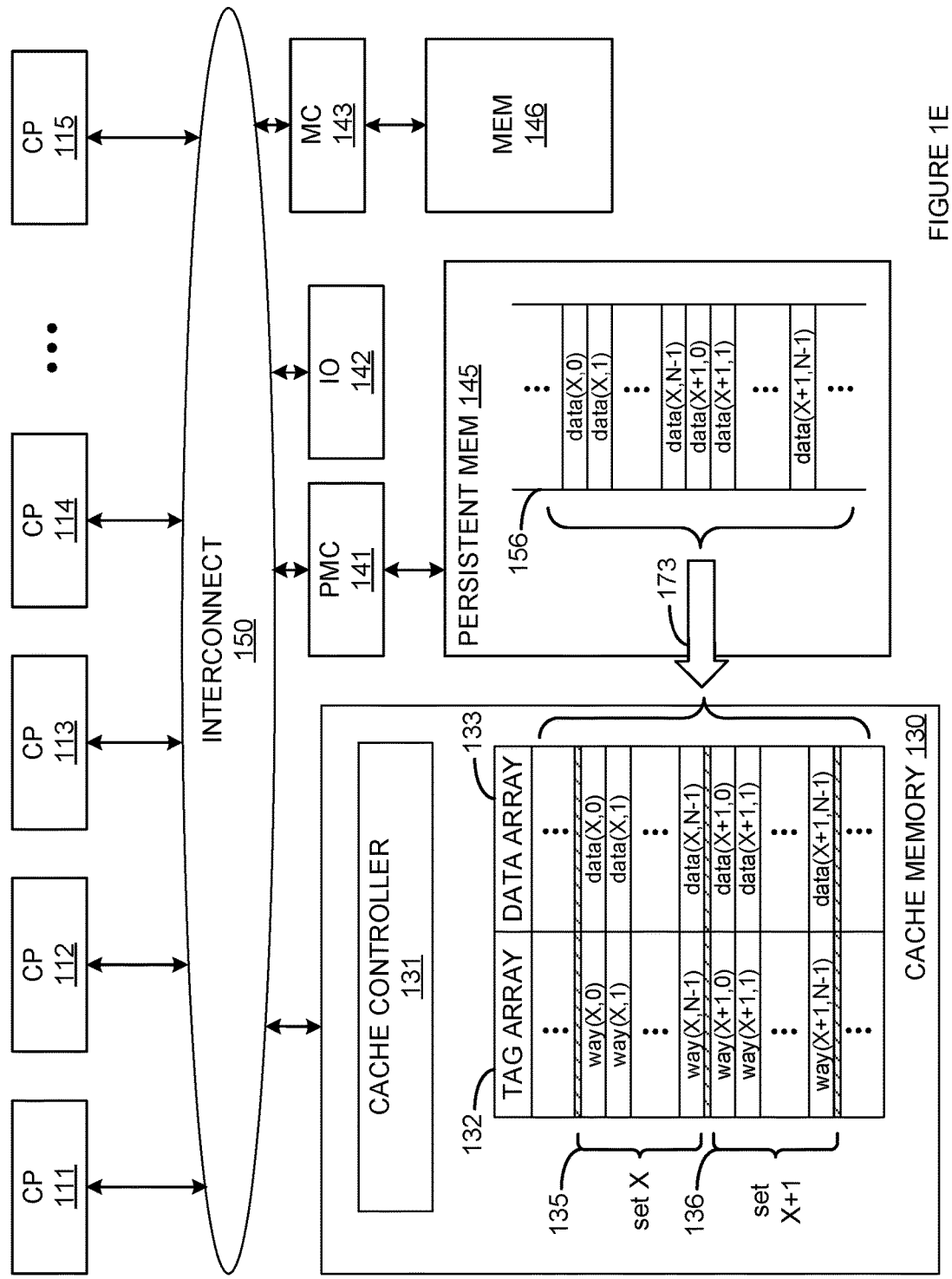
FIG. 1E illustrates the processing system returning the data array of the cache to a fully operational mode.

After the second requested cache line is copied back to cache memory 130, the remaining cache lines stored in memory 145 may be copied into the (now operational) data array 133. This is illustrated in FIG. 1E by at least arrow 173.

FIG. 2 is a flowchart illustrating a method of operating a cache memory system. The steps illustrated in FIG. 2 may be performed by one or more elements of processing system 100 and/or its components. An indicator that a cache memory (organized as a set of cache lines and a set of tag entries) that is in an operable power consumption state is to be placed into a reduced power consumption state is received (202). For example, cache controller 131 may receive an indicator that cache memory 130 should prepare to be placed into a reduced power consumption state where data array 133 will not be operable.

In response to at least the indicator, at least a set of valid cache lines are copied from the cache memory to a memory located separate from the cache memory (204). For example, in response to being informed that cache memory 130 will soon be placed in a reduced power consumption state, cache controller 131 may copy the contents of data array 133 to memory 145 in order to make a mirror image of the contents of data array 133. In another example, cache controller 131 may walk through the entries in tag array 132 and only copy the valid cache lines from data array 133 to memory 145. Cache controller 131 may map the locations that the cache lines from 133 are stored in memory 145 based on information stored in tag array 132. Cache controller 131 may select the locations that the cache lines from 133 are stored in memory 145 such that information stored in tag array 132 can be used to quickly determine the location of a given cache line copy in memory 145 using the corresponding tag entry in tag array 133.

The cache memory is placed into the reduced power consumption state where the set of cache lines in the cache memory are not accessed while the cache memory is in the reduced power consumption state (206). For example, cache memory 130 may be placed in a reduced power consumption state whereby data array 133 is powered off (e.g., power supply removed) or otherwise rendered inoperable (e.g., power supply reduced). Because data array 133 is inoperable, cache controller 131 does not access data array 133.

While the cache memory is in the reduced power consumption state, a cache access request for a cache line is received (208). For example, while cache memory 130 is in the reduced power consumption state, cache controller 131 may receive a request for a cache line. The requested cache line may correspond to a cache line that was being stored by data array 133 (with corresponding tag entry in tag array 132) before cache memory 130 was placed in the reduced power state.

While the cache memory is in the reduced power consumption state, the set of tag entries are used to perform a tag lookup corresponding the cache access request (210). For example, in response to the cache line requests that are received while cache memory 130 is in the reduced power state, cache controller 131 can still query tag array 132 to determine whether a copy of the requested cache line was copied to memory 145. If a copy of the requested cache line was copied to memory 145, cache controller 131 may retrieve a copy of that line from memory 145 and provide it to the requestor. In another example, if a copy of the requested cache line was copied to memory 145, cache controller 131 may re-activate data array 133 and copy the cache line from memory 145 to data array 133.

FIG. 3 is a flowchart illustrating a method of changing the operating mode of a cache memory system. The steps illustrated in FIG. 3 may be performed by one or more elements of processing system 100 and/or its components. A cache memory that is organized as a set of cache lines and a set of tag entries is placed into a reduced power consumption state that renders the set of cache lines inoperable and the set of tag entries operable (302). For example, processing system 100 (e.g., under the control of a program and/or operating system running on processing system 100) may place cache memory 130 in a reduced power consumption state that turns data array 133 off but leaves tag array 132 powered on.

While the cache memory is in the reduced power consumption state, the set of tag entries are used to perform a tag lookup corresponding to a cache access request (304). For example, while cache memory 130 is in the reduced power consumption state, cache controller 131 may still respond to cache requests (e.g., read, snoop, etc.) by looking up the requested cache lines in tag array 132. Based on the result of the tag lookup, it is determined that a copy of the cache line corresponding to the cache access request is stored in persistent storage (306). For example, when cache controller 131 looks up a requested cache line in tag array 132, cache controller 131 may determine there is an entry in tag array that corresponds to the requested cache line (i.e., a tag hit.) Since cache memory 130 is in the reduced power consumption state, cache controller 131 can determine, based on the result of the tag lookup, whether the contents of the requested cache line have been copied to persistent memory 145. In other words, if cache controller 131 determined from the contents of tag array 132 that there was a cache miss, cache controller 131 can conclude that the requested cache line is not part of data 156 that is comprised the cache lines from data array 133. If cache controller 131 determined from the contents of tag array 132 that there was a cache hit, cache controller 131 can conclude that the requested cache line is part of data 156.

Based on the result of the tag lookup, the location in persistent storage of the copy of the cache line corresponding to the cache access request is determined (308). For example, based on the contents of the tag entry corresponding to the requested cache line, cache controller 131 can determine the location in memory 145 that corresponds to the copy of the requested cache line. Cache controller 131 may be able to determine the location in memory 145 that corresponds to the copy of the requested cache line by using a mapping function (e.g., hashing function) or other algorithmic transformation (e.g., index or pointer into memory 145) that uses at least one or more fields of the corresponding tag entry as an input.

The cache memory is placed in a power consumption state that renders the set of cache line operable (310). For example, processing system 100 (e.g., under the control of a program and/or operating system running on processing system 100) may return cache memory 130 to a power consumption state that turns data array 133 on. In another example, cache controller 131 may return cache memory 130 to a power consumption state that has data array 133 operational in response to the cache hit on the requested cache line.

The cache line corresponding to the cache access request is copied into the set of cache lines (312). For example, cache controller 131 may retrieve, from memory 145, a block of data 156 that includes the requested cache line. When cache controller 131 receives the block of data 156 that includes the requested cache line, cache controller 131 may copy the requested cache line into the corresponding entry in data array 133. Cache controller 131 may retrieve and copy the requested cache line into the corresponding entry in data array 133 before any other (e.g., non-requested or later requested) cache lines are retrieved from memory 145. In this manner, once the requested cache line has been copied into the corresponding entry in data array 133, cache controller 131 may respond to the cache access request.

Other cache lines are copied into the set of cache lines (314). For example, cache controller 131 may retrieve and copy the next cache line to be requested into the corresponding entry in data array 133. In another example, cache controller 131 may retrieve data block 156 and copy contents of data block 156 (e.g., all of the remaining cache lines, or just the valid cache lines) into data array 133.

FIG. 4 is a flowchart illustrating a method of placing and operating a cache memory system in a lower power mode. The steps illustrated in FIG. 4 may be performed by one or more elements of processing system 100 and/or its components. At a cache memory and while the cache memory is in a first power consumption state, a first cache access request corresponding to a cache line stored in a storage array of the cache memory is received, where the cache memory includes a tag array that is used to determine whether the storage array holds the first cache line (402). For example, when an access request (e.g., read, write, snoop, invalidate, etc.) is received, cache controller 131 may compare a tag field of the access address to tag values currently stored in a corresponding tag way of the tag array 132. If a tag match exists, and the tag is valid, then cache memory 130 has determined that data array 133 holds a copy of the requested cache line.

Before the cache memory is place in a second power consumption state, the cache line is copied to an archive memory that is separate from the cache memory (404). For example, before turning off data array 133, cache controller 131 (and/or another component of processing system 100) may copy a cache line to persistent memory 145. This cache line may have been the subject of a previous cache line request.

The cache memory is place in the second power consumption state, where the storage array is not operable while the cache memory is in the second power consumption state and the tag array is operable while the cache memory is in the second power consumption state (406). For example, processing system 100 (and/or cache controller 131), in order to reduce the power consumption of cache memory 130, may turn off data array 133 while leaving tag array 132 operational.

While the cache memory is in the second power consumption state, a second cache access request corresponding to the cache line is received (408). For example, while data array 133 is turned off (or otherwise rendered inoperable), cache controller 131 may receive an access request that corresponds to a cache line that was copied to persistent memory 145.

In response to the second cache access request, and while the cache memory is in the second power consumption state, it is determined, using the tag array, that a copy of the cache line is stored in the archive memory (410). For example, while data array 133 is turned off, cache controller 131 may still determine, by using the contents of tag array 133, whether a cache access request is a 'hit' in cache memory 130.

FIG. 5 is a flowchart illustrating a method of responding to a cache request while the cache memory system is in a lower power mode. The steps illustrated in FIG. 5 may be performed by one or more elements of processing system 100 and/or its components. A cache memory is operated in a reduced power consumption state where the storage array of the cache memory is not operable and where the tag array is operable (502). For example, cache memory 130 may be operated in a state whereby tag array 132 and cache controller 131 continue to operate while data array 133 is turned off.

A cache access request corresponding to a cache line is received (504). For example, cache memory 130 may receive a request for a cache line that may or may not hit in tag array 132. In response to the second cache access request, and while the cache memory is in the reduced power consumption state, it is determined, using the tag array, that a copy of the cache line is stored in a separate memory (506). For example, while data array 133 is turned off, cache controller 131 may us tag array 132 to determine whether a copy of the contents of a cache line are stored in persistent memory 145.

The location in the separate memory of the copy of the cache line is determined (508). For example, cache controller 131 may determine where in memory 145 a copy of the requested cache line resides. Cache controller 131 may determine where in memory 145 a copy of the requested cache line resides by using a mapping function. Cache controller 131 may determine where in memory 145 a copy of the requested cache line resides by using a mapping function that uses at least a portion of a corresponding entry in tag array 132 as an input to the mapping function.

The copy of the cache line is received before copying other cache lines into the storage array of the cache memory (510). For example, cache controller 131 may retrieve, from memory 145, a copy of the requested cache line before cache controller 131 requests other cache lines from memory 145. Cache controller 131 may receive the copy of the requested cache line before data array 133 is turned back on. Cache controller 131 may use the copy of the requested cache line to respond to the cache access request before data array 133 is turned back on.

The other cache lines are copied into the storage array of the cache memory (512). For example, data array 133 may be turned back on (i.e., made operational). The previous contents of data array 133 may then be retrieved from memory 145 and stored in data array 133.

Based on the contents of the separate memory, the cache memory is operated in a power consumption state where both the storage array and the tag array are operable (514).

For example, once the previous contents of data array 133 are restored, cache memory 130 may be operated using both tag array 132 and data array 133 where data array 133 has been populated with data restored from memory 145.

The methods, systems and devices described herein may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of processing system 100, and/or its components. These software descriptions may be: behavioral, register transfer, logic component, transistor, and layout geometry-level descriptions.

Data formats in which such descriptions may be implemented are stored on a non-transitory computer readable medium include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Physical files may be implemented on non-transitory machine-readable media such as: 4 mm magnetic tape, 8 mm magnetic tape, 3½-inch floppy media, CDs, DVDs, hard disk drives, solid-state disk drives, solid-state memory, flash drives, and so on.

Alternatively, or in addition to, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), multi-core processors, graphics processing units (GPUs), etc.

Figure 6:
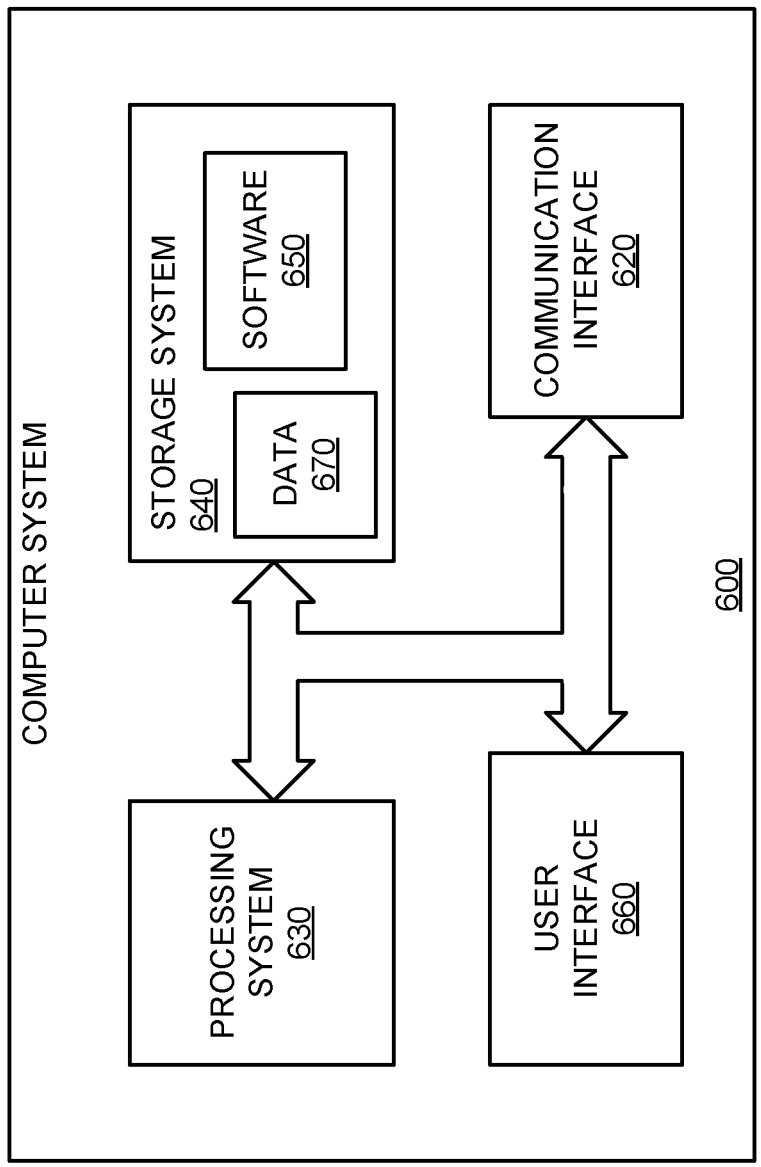
FIG. 6 is a block diagram of a computer system.

FIG. 6 illustrates a block diagram of an example computer system. In an embodiment, computer system 600 and/or its components include circuits, software, and/or data that implement, or are used to implement, the methods, systems and/or devices illustrated in the Figures, the corresponding discussions of the Figures, and/or are otherwise taught herein.

Computer system 600 includes communication interface 620, processing system 630, storage system 640, and user interface 660. Processing system 630 is operatively coupled to storage system 640. Storage system 640 stores software 650 and data 670. Processing system 630 is operatively coupled to communication interface 620 and user interface 660. Processing system 630 may be an example of processing system 100, and/or its components.

Computer system 600 may comprise a programmed general-purpose computer. Computer system 600 may include a microprocessor. Computer system 600 may comprise programmable or special purpose circuitry. Computer system 600 may be distributed among multiple devices, processors, storage, and/or interfaces that together comprise elements 620-670.

Communication interface 620 may comprise a network interface, modem, port, bus, link, transceiver, or other communication device. Communication interface 620 may be distributed among multiple communication devices. Processing system 630 may comprise a microprocessor, microcontroller, logic circuit, or other processing device. Processing system 630 may be distributed among multiple processing devices. User interface 660 may comprise a keyboard, mouse, voice recognition interface, microphone and speakers, graphical display, touch screen, or other type of user interface device. User interface 660 may be distributed among multiple interface devices. Storage system 640 may comprise a disk, tape, integrated circuit, RAM, ROM, EEPROM, flash memory, network storage, server, or other memory function. Storage system 640 may include computer readable medium. Storage system 640 may be distributed among multiple memory devices.

Processing system 630 retrieves and executes software 650 from storage system 640. Processing system 630 may retrieve and store data 670. Processing system 630 may also retrieve and store data via communication interface 620. Processing system 650 may create or modify software 650 or data 670 to achieve a tangible result. Processing system may control communication interface 620 or user interface 660 to achieve a tangible result. Processing system 630 may retrieve and execute remotely stored software via communication interface 620.

Software 650 and remotely stored software may comprise an operating system, utilities, drivers, networking software, and other software typically executed by a computer system. Software 650 may comprise an application program, applet, firmware, or other form of machine-readable processing instructions typically executed by a computer system. When executed by processing system 630, software 650 or remotely stored software may direct computer system 600 to operate as described herein.

Implementations discussed herein include, but are not limited to, the following examples:

EXAMPLE 1

An apparatus for processing data, comprising: a cache memory comprising a storage array and a tag array, the storage array organized into a plurality of cache lines, the tag array providing an index of storage locations associated with data blocks stored in the storage array; a memory located separate from the cache memory, the apparatus configured to store data stored by the plurality of cache lines in the memory based at least in part on the cache memory being in a reduced power consumption state, the tag array to be operational while the cache memory is in the reduced power consumption state; and, a controller configured to write data stored by the plurality of cache lines to the memory before the cache memory is placed in the reduced power consumption state.

EXAMPLE 2

The apparatus of example 1, wherein data stored by the plurality of cache lines is to be stored in the memory according to a mapping function that relates locations in the tag array to locations in the memory of corresponding cache lines.

EXAMPLE 3

The apparatus of example 2, wherein, while the cache is in the reduced power consumption state, the controller is configured to, based at least in part on a cache access request for a cache line that was stored by the storage array before the cache memory was placed in the reduced power consumption state, retrieve a block of data from the memory that includes the data stored by the cache line prior to the cache memory being placed in the reduced power consumption state.

EXAMPLE 4

The apparatus of example 3, wherein the controller retrieves, from the memory, data stored by the cache line before retrieving data previously stored by other cache lines.

EXAMPLE 5

The apparatus of example 4, wherein the mapping function indexes cache memories, ways, and banks therein to locations in the memory.

EXAMPLE 6

The apparatus of example 1, further comprising: a plurality of last-level caches that can be placed in at least a high power consumption state and the reduced power consumption state, the plurality of last-level caches including the cache memory; and, a plurality of processor cores to access data in the plurality of last-level caches according to a first hashing function that maps processor access addresses to respective ones of the plurality of last-level caches based at least in part on all of the last-level caches being in the first high power consumption state, the plurality of processor cores to access data in the plurality of last-level caches according to a second hashing function that maps processor access addresses to a subset of the plurality of last-level caches based at least in part on at least one of the last-level caches being in the reduced power consumption state.

EXAMPLE 7

The apparatus of example 6, wherein the subset of the plurality of last-level caches does not include the cache memory.

EXAMPLE 8

A method of operating a cache memory system, comprising: receiving an indicator that a cache memory in an operable power consumption state is to be placed into a reduced power consumption state, the cache memory organized as a set of cache lines and a set of tag entries, the tag entries providing an index to the cache lines in the cache memory; based at least in part on the indicator, copying at least a set of valid cache lines from the cache memory to a memory located separate from the cache memory; placing the cache memory in the reduced power consumption state, wherein the set of cache lines are not accessed while the cache memory is in the reduced power consumption state; while the cache memory is in the reduced power consumption state, receiving a cache access request for a cache line; and, while the cache memory is in the reduced power consumption state, performing, using the set of tag entries, a tag lookup corresponding the cache access request.

EXAMPLE 9

The method of example 8, further comprising: based on the result of the tag lookup, determining the cache line is not stored in the memory.

EXAMPLE 10

The method of example 8, further comprising: based on the result of the tag lookup, determining the cache line is stored in the memory.

EXAMPLE 11

The method of example 10, further comprising: based on the result of the tag lookup, determining a location in the memory that corresponds to the cache line.

EXAMPLE 12

The method of example 11, wherein the result of the tag lookup includes a tag way and tag bank that hold a tag entry corresponding to the cache line.

EXAMPLE 13

The method of example 12, wherein the location in the memory is determined using a mapping function that relates the tag way and tag bank to the location in memory.

EXAMPLE 14

The method of example 13, further comprising: based at least in part on a first set of last-level caches of a plurality of last-level caches being in operable power consumption states, mapping, using a first hashing function, accesses by a first processor core of the plurality of processor cores to the first set of last-level caches, the first set of last-level caches including the cache memory; and, based at least in part on a second set of last-level caches of the plurality of last-level caches being in operable power-consumption states, mapping, using a second hashing function, accesses by the first processor core to the second set of last-level caches, the second set of last-level caches not including the cache memory.

EXAMPLE 15

A method of operating a processing system, comprising: receiving, at a cache memory and while the cache memory is in a first power consumption state, a first cache access request corresponding to a cache line stored in a storage array of the cache memory, the cache memory including a tag array that is used to determine whether the storage array holds the cache line; before placing the cache memory in a second power consumption state, copying the cache line to an archive memory that is separate from the cache memory; placing the cache memory in the second power consumption state, the storage array not operable while the cache memory is in the second power consumption state, the tag array being operable while the cache memory is in the second power consumption state; while the cache memory is in the second power consumption state, receiving a second cache access request corresponding to the cache line; and, based at least in part on the second cache access request, and while the cache memory is in the second power consumption state, determining, using the tag array, that a copy of the cache line is stored in the archive memory.

EXAMPLE 16

The method of example 15, wherein a location in the tag array that corresponds to the cache line is mapped to a location in the archive memory by a mapping function.

EXAMPLE 17

The method of example 16, further comprising: before copying other cache lines from the archive memory, copying the cache line from the archive memory.

EXAMPLE 18

The method of example 16, further comprising: placing the cache memory in the first power consumptions state; and, copying the other cache lines from the archive memory to the storage array.

EXAMPLE 19

The method of example 18, wherein the first cache line is copied from the archive memory to provide the cache line based at least in part on the second cache access request.

EXAMPLE 20

The method of example 18, wherein the other cache lines are copied from the archive memory to restore the contents of the storage array.

The foregoing descriptions of the disclosed embodiments have been presented for purposes of illustration and description. They are not intended to be exhaustive or to limit the scope of the claimed subject matter to the precise form(s) disclosed, and other modifications and variations may be possible in light of the above teachings. The embodiments were chosen and described in order to best explain the principles of the disclosed embodiments and their practical application to thereby enable others skilled in the art to best utilize the various embodiments and various modifications as are suited to the particular use contemplated. It is intended that the appended claims be construed to include other alternative embodiments except insofar as limited by the prior art.

What is claimed is:

1. An apparatus for processing data, comprising:
   a cache memory comprising a storage array and a tag array, the storage array organized into a plurality of cache lines, the tag array providing an index of storage locations associated with data blocks stored in the storage array;
   a memory located separate from the cache memory, the apparatus configured to store data stored by the plurality of cache lines in the memory based at least in part on the cache memory being in a reduced power consumption state, the tag array to be operational while the cache memory is in the reduced power consumption state such that locations in the tag array, of the data stored by the plurality of cache lines, are related to corresponding locations in the memory based on the index; and
   a controller configured to write data stored by the plurality of cache lines to the memory before the cache memory is placed in the reduced power consumption state, and also configured to, while the cache memory is in the reduced power consumption state, based at least in part on a cache access request for a cache line that was stored by the storage array before the cache memory was placed in the reduced power consumption state, retrieve a data block from the memory that includes the data stored by the cache line prior to the cache memory being placed in the reduced power consumption state.

2. The apparatus of claim 1, wherein data stored by the plurality of cache lines is to be stored in the memory according to a mapping function that relates the locations in the tag array to the locations in the memory of corresponding cache lines.

3. The apparatus of claim 1, wherein the controller retrieves, from the memory, the data stored by the cache line before retrieving data previously stored by other cache lines.

4. The apparatus of claim 3, wherein the mapping function indexes cache memories, ways, and banks therein to locations in the memory.

5. The apparatus of claim 1, further comprising:
   a plurality of last-level caches that can be placed in at least a high power consumption state and the reduced power consumption state, the plurality of last-level caches including the cache memory; and
   a plurality of processor cores to access data in the plurality of last-level caches according to a first hashing function that maps processor access addresses to respective ones of the plurality of last-level caches based at least in part on all of the last-level caches being in the first high power consumption state, the plurality of processor cores to access data in the plurality of last-level caches according to a second hashing function that maps processor access addresses to a subset of the plurality of last-level caches based at least in part on at least one of the last-level caches being in the reduced power consumption state.

6. The apparatus of claim 5, wherein the subset of the plurality of last-level caches does not include the cache memory.

7. A method of operating a cache memory system, comprising:
   receiving an indicator that a cache memory in an operable power consumption state is to be placed into a reduced power consumption state, the cache memory organized as a set of cache lines and a set of tag entries, the tag entries providing an index to the cache lines in the cache memory;
   based at least in part on the indicator, copying at least a set of valid cache lines from the cache memory to a memory located separate from the cache memory based on the index such that locations in the set of tag entries are related to corresponding location in the memory;
   placing the cache memory in the reduced power consumption state, wherein the set of cache lines are not accessed while the cache memory is in the reduced power consumption state;
   while the cache memory is in the reduced power consumption state, receiving a cache access request for a cache line;
   while the cache memory is in the reduced power consumption state, performing, using the set of tag entries, a tag lookup corresponding to the cache access request; and
   based on a result of the tag lookup, determining a location in the memory that corresponds to the cache line and retrieving data at the location in the memory corresponding to the cache line.

8. The method of claim 7, wherein the result of the tag lookup includes a tag way and tag bank that hold a tag entry corresponding to the cache line.

9. The method of claim 8, wherein the location in the memory is related to the tag way and tag bank based on a mapping function.

10. The method of claim 9, further comprising:
based at least in part on a first set of last-level caches of a plurality of last-level caches being in operable power consumption states, mapping, using a first hashing function, accesses by a first processor core of the plurality of processor cores to the first set of last-level caches, the first set of last-level caches including the cache memory; and,
based at least in part on a second set of last-level caches of the plurality of last-level caches being in operable power-consumption states, mapping, using a second hashing function, accesses by the first processor core to the second set of last-level caches, the second set of last-level caches not including the cache memory.

11. A method of operating a processing system, comprising:
receiving, at a cache memory and while the cache memory is in a first power consumption state, a first cache access request corresponding to a cache line stored in a storage array of the cache memory, the cache memory including a tag array providing an index that is used to determine whether the storage array holds the cache line;
before placing the cache memory in a second power consumption state, copying the cache line to an archive memory that is separate from the cache memory;
placing the cache memory in the second power consumption state, the storage array not operable while the cache memory is in the second power consumption state, the tag array being operable while the cache memory is in the second power consumption state such that a location of the cache line in the storage array is related to a corresponding location in the archive memory based on the index;
while the cache memory is in the second power consumption state, receiving a second cache access request corresponding to the cache line; and
based at least in part on the second cache access request, and while the cache memory is in the second power consumption state, determining, using the tag array, the corresponding location of the cache line in the archive memory and retrieving data at the corresponding location of the cache line in the archive memory.

12. The method of claim 11, wherein the location in the tag array that corresponds to the cache line is mapped to the corresponding location in the archive memory by a mapping function.

13. The method of claim 12, further comprising:
before copying other cache lines from the archive memory, copying the cache line from the archive memory.

14. The method of claim 12, further comprising:
placing the cache memory in the first power consumptions state; and,
copying other cache lines from the archive memory to the storage array.

15. The method of claim 14, wherein the first cache line is copied from the archive memory to provide the cache line based at least in part on the second cache access request.

16. The method of claim 14, wherein the other cache lines are copied from the archive memory to restore the contents of the storage array.

* * * * *